E. A. SCOTT.
ELECTRIC CRANKING DEVICE FOR AUTOMOBILES.
APPLICATION FILED AUG. 8, 1910.

1,001,174. Patented Aug. 22, 1911.

Witnesses
Frank R. Hou
B. F. Shambaugh

Inventor
E. A. Scott
By George J. Thorpe Atty.

UNITED STATES PATENT OFFICE.

EDWARD A. SCOTT, OF KANSAS CITY, MISSOURI.

ELECTRIC CRANKING DEVICE FOR AUTOMOBILES.

1,001,174.   Specification of Letters Patent.   Patented Aug. 22, 1911.

Application filed August 3, 1910. Serial No. 576,222.

*To all whom it may concern:*

Be it known that I, EDWARD A. SCOTT, a citizen of the United States, residing at Kansas City, in the county of Jackson and State of Missouri, have invented certain new and useful Improvements in Electric Cranking Devices for Automobiles, of which the following is a specification.

This invention relates to electric cranking devices for automobiles, of that class whereby the engine of the automobile can be easily cranked without exertion by chauffeur or driver while seated in the machine, and my object is to produce a device of this character of simple, strong, durable and inexpensive construction.

With this object in view and others as hereinafter appear, the invention consists in certain novel and peculiar features of construction and organization as hereinafter described and claimed; and in order that it may be fully understood reference is to be had to the accompanying drawing, in which—

Figure 1:
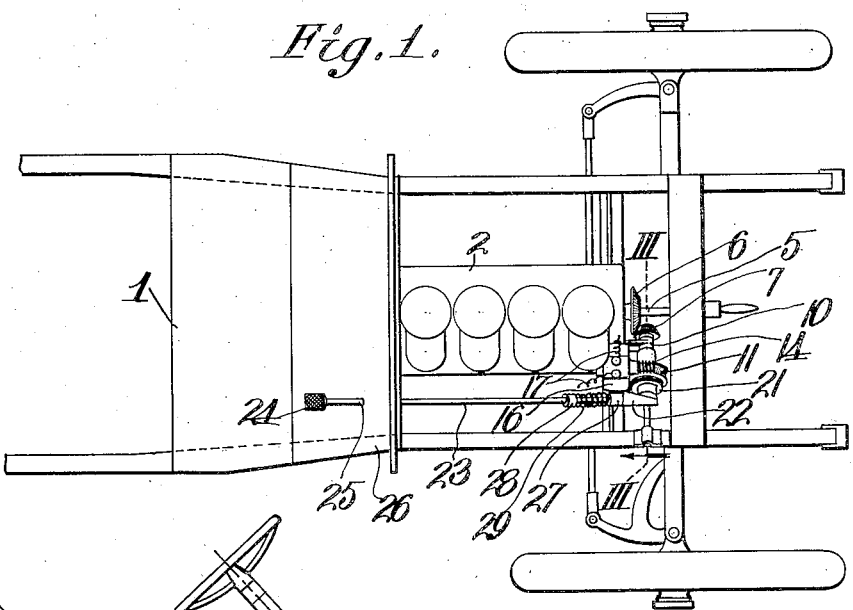
Figure 2:
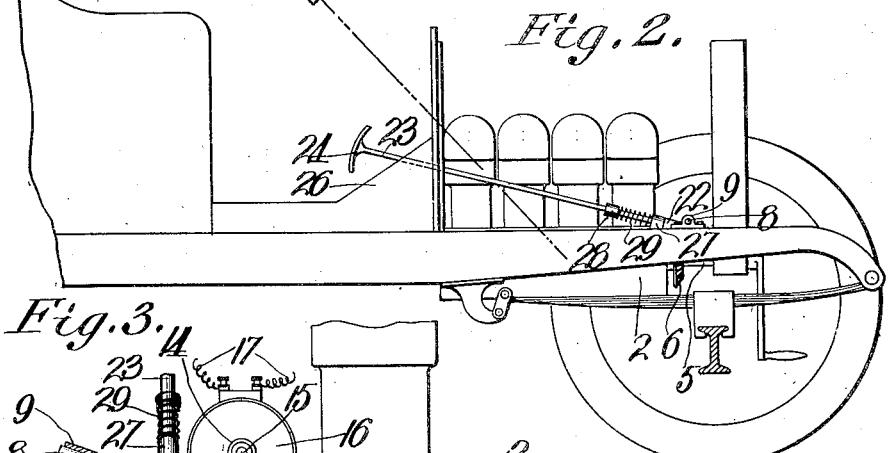
Figures 3, 4:
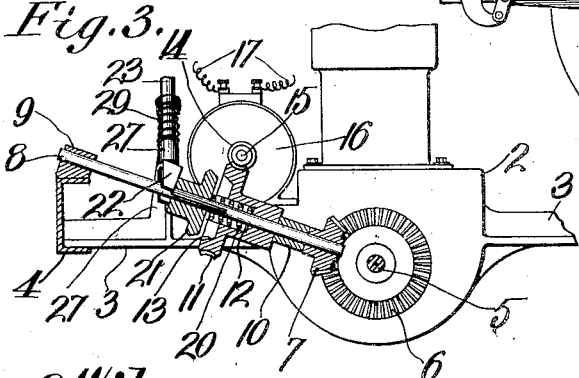

Figure 1, is a plan view of a part of an automobile, embodying my invention. Fig. 2, is a side view of the same. Fig. 3, is an enlarged section on the line III—III of Fig. 1. Fig. 4, is a diagrammatic view showing the electrical circuit.

In the said drawing, 1 indicates an automobile of any suitable or preferred type, and 2 the engine thereof, the bed 3 of the same being supported upon the side bars 4 of the chassis of the machine. Mounted upon the crank shaft 5 of the engine is a bevel gear 6, meshing with a bevel pinion 7 mounted on shaft 8, journaled in suitable bearings, the outer bearing 9 being preferably secured upon the right hand bar of the chassis and the inner bearing 10, upon the engine in any suitable or preferred manner.

Journaled on shaft 8, is a clutch member provided with peripheral worm teeth 11, a socket 12, and a circular friction surface 13, and said worm teeth mesh with a worm 14 mounted on the front end of shaft 15 of a motor 16, secured in rigid relation to the engine, the motor being wired as at 17 to a battery 18 and a switch 19, shown only in Fig. 4, and by preference the circuit includes the engine, as also shown in Fig. 4. Occupying the socket of the said clutch member is a spring 20 to hold a slidable friction clutch member 21 mounted upon shaft 8, out of engagement with the friction surface 13, and bearing against the opposite side of said slidable friction clutch member is the slotted wedge or cam head 22, of the push bar 23, provided with a foot plate 24 at its rear end so that the driver may advance said bar by placing his foot upon the push plate and exerting forward pressure thereon, the said slide bar having a bearing at its rear end at 25 in the foot board 26 of the car and in a bearing 27 rigid with the engine. To hold the push bar normally retracted it is provided with a collar 28 and a spring 29, the latter bearing at its front end against bearing 27 and at its rear end against said collar.

Assuming that the parts occupy the positions shown and that it is desired to crank the engine, the operator completes the circuit by the proper manipulation of switch 19 to start the motor and impart rotation to the clutch member provided with the worm teeth 11. He then places his foot upon the foot plate 24 and pushes bar 23 forward against the resistance of spring 29, and by such action causes the wedge or cam head 22 to slide the friction clutch member 21 inwardly on shaft 8 against the resistance of spring 20, until said last-named clutch member engages the friction surface 13 and is rotated thereby, the rotation of said clutch member 21 imparting like movement to shaft 8 and effecting rotation of the crank shaft of the engine. As the latter starts the operator withdraws his foot from the foot plate to permit spring 29 to return the push bar to its original position and thus permit spring 20 to force the clutch member 21 out of engagement with the other clutch member without affecting or being affected by the motor. The operator then breaks the circuit by proper manipulation of the switch to arrest the motor and clutch member geared thereto.

When the engine starts it of course operates at much greater speed than that imparted to its shaft by the motor, but this does not impose any strain on the motor which might be injurious thereto, because it is possible for the clutch member 21 rotating with the engine to slip and therefore rotate at a greater speed than the other clutch member.

Should the engine "kick back" instead of forward and thus impart back rotation to shaft 8, the clutch member 21 will turn backward without injury to the motor as the said clutch member will slip, as the engagement between clutch member 21 and the other clutch member permits of slipping action.

From the above description it will be apparent that I have produced a crankng device for automobiles embodying the feature of advantage enumerated as desirable and I wish it to be understood that I reserve the right to make all changes properly falling within the spirit and scope of the appended claims.

Having thus described the invention what I claim as new and desire to secure by Letters-Patent, is:—

1. The combination with the engine of a motor car and the shaft of such engine, of a shaft geared to the engine shaft, a clutch member rotatable with and sidable on the second shaft, a clutch member rotatable only on said second shaft and adapted to be engaged by and drive the slidable clutch member, a spring normally holding the clutch members out of engagement, a motor to impart rotation to the clutch member having rotatable movement only, and means for forcing the slidable clutch member into engagement with the other clutch member.

2. The combination with the engine of a motor car, and the shaft of such engine, of a shaft geared to the engine shaft, a clutch member rotatable and slidable on the second shaft, a clutch member rotatable only on said second shaft and adapted to be engaged by and drive the slidable clutch member, a spring normally holding the clutch members out of engagement, a motor to impart rotation to the clutch member having rotatable movement only, and a push-bar provided with a wedge head for forcing the slidable clutch member into engagement with the other clutch member.

3. The combination with the engine of a motor car, and the shaft of such engine, of a shaft geared to the engine shaft, a clutch member rotatable and slidable on the second shaft, a clutch member rotatable only on said second shaft and adapted to be engaged by and drive the slidable clutch member, a spring normally holding the clutch members out of engagement, a motor to impart rotation to the clutch member having rotatable movement only, a push-bar provided with a wedge head for forcing the slidable clutch member into engagement with the other clutch member, and automatic means for effecting the withdrawal of the push bar to permit the clutch members to be disengaged by said spring.

4. The combination with the engine of a motor car, and the shaft of such engine, of a shaft geared to the engine shaft, a clutch member rotatable and slidable on the second shaft, a clutch member rotatable only on said second shaft and adapted to be engaged by and drive the slidable clutch member, a spring normally holding the clutch members out of engagement, a motor to impart rotation to the clutch member having rotatable movement only, a push-bar provided with a wedge head for forcing the slidable clutch member into engagement with the other clutch member, and a spring for effecting the withdrawal of the push bar to permit the first-named spring to move the slidable clutch member out of engagement with the other clutch member.

In testimony whereof I affix my signature, in the presence of two witnesses.

EDWARD A. SCOTT.

Witnesses:
 HELEN C. RODGERS,
 G. Y. THORPE.